Patented June 10, 1924.

1,497,657

UNITED STATES PATENT OFFICE.

FRANK JULIAN ANDRESS, OF CINCINNATI, OHIO, ASSIGNOR TO GORDON WEIL AND BERT WEIL, BOTH OF CINCINNATI, OHIO.

PROCESS OF STERILIZING FOOD AND BEVERAGE PRODUCTS.

No Drawing.   Application filed April 28, 1923.   Serial No. 635,376.

*To all whom it may concern:*

Be it known that I, FRANK JULIAN ANDRESS, a citizen of the United States, and residing at 625 Crown St., Walnut Hills, Cincinnati, in the county of Hamilton and State of Ohio, have invented a new and useful Process of Sterilizing Food and Beverage Products, of which the following specification is a full disclosure.

My invention relates to a process of treating perishable food and beverage fluids, more especially in the nature of milk or cream, or flavored milks or syrups to be sold with charged water or to be bottled and carbonated, a specific example of which is milk-chocolate or cocoa, the use of which as a beverage is now confined to soda fountains because it has not heretofore been sufficiently sterilized to be able to ship as a syrup or as a bottled or carbonated beverage. Milk and cream contain bacterial organisms and so do flavoring fluids such as syrups, chocolate or cocoa solutions.

One of the objects of the invention is to provide a sterilizing treatment or processing which will destroy these bacteria.

Another object of the invention is to provide a sterilizing or processing treatment which will not require treatment temperatures sufficiently high to burn or scorch the milk or to produce in chocolate or cocoa solutions the formation of a product having a consistency of photopaste or corn starch, the formation of which is injurious to the beverage.

In short, the object of the invention is to produce absolutely sterilized beverages, or syrups for beverages, in which the bacteria are wholly destroyed without any impairment whatever of the characteristic food or beverage flavors or the consistency of the resultant product. This process sterilizes both milk syrups and chocolate syrups, either singly or in mixture.

Another object of my invention is to use in conjunction with the low temperature treatments an oxidizing agent which can be readily broken up to liberate oxygen in an ionized condition and which can be eliminated readily from the fluid after the treatment.

I found that in this class of beverages the ionized oxygen attacks the bacterial organisms with very much increased avidity and, as explained, it is necessary to utilize an oxidizing agent which will be rendered effective at low temperatures, say not to exceed 140° F.

In carrying out my process, which can be illustrated in the instance of milk or cream, or a mixture of milk and chocolate commonly known as milk-chocolate, the milk or the mixture is brought to a temperature ranging between 128° and 140° F., which will not be sufficient to burn or scorch the milk.

To the treatment fluid so heated and during constant agitation there is mixed in hydrogen peroxide of 3% strength (U. S. P.) in the proportion of about 56 cubic centimeters to 160 cubic centimeters per gallon of syrup. The hydrogen peroxide is added very slowly during the agitation in order to avoid any undue local concentration.

Preferably the temperature above mentioned is maintained for a period of sixty minutes or longer, although with periods as little as thirty minutes excellent results have been obtained, and I do not wish to be limited to the relative period of heat treatment as it would vary with different conditions and different materials and depending upon results desired.

The hydrogen peroxide being agitated and mixed into the heated fluid will decompose, yielding ionized oxygen which rapidly and effectively attacks the bacterial organisms present and which will at the same time not change the consistency of the fluid or injure the food or beverage value or flavor characteristics.

Preferably the treatment fluid after the heating period is allowed to slowly cool and during which cooling period agitation may be maintained if desired to hasten the elimination of the hydrogen peroxide.

This cooling period is sufficient to substantially eliminate all traces of the hydrogen peroxide, the by-products of the reduction being simply $H_2O$ and oxygen, which are perfectly innocuous and which do not leave any offensive taste or odors.

The product is a substantially sterilized food or beverage fluid of the desired consistency retaining the characteristics of the fresh product. This fluid or compound can be bottled and it will stand indefinitely. It can be mixed with carbonated water or charged, it can be sent out and shipped as a syrup for carbonating or it can be diluted and bottled after the order of "pop".

One of the characteristics of this treatment process, when processing such beverages as milk chocolate, is that the chocolate or cocoa does not become ropy as in ordinary sterilizing processes and materials. The starchy components will not form into a starchy jell and the milk will not curdle.

To date all attempts of preparing a milk syrup flavor beverage which will remain unchanged over a reasonable period of time and at ordinary temperatures have failed. All preparations now on the market approaching the nature of products described in this application require that they be kept at low temperatures to prevent decomposition.

The process herein described produces a product which will remain unchanged at ordinary temperatures.

To illustrate:

Bottles of "pop" prepared from syrup process as herein described, have remained unchanged when exposed to body temperatures in incubators several weeks without any physical evidences of decomposition; the product was sterile at the end of this test. Whereas products similarly prepared, but not processed by the method as herein described, remain unchanged but a few hours after being exposed to the same conditions; bacterial counts on this decomposed product indicated that the decomposition was the result of the activity of bacterial organisms acting upon the milk sugar (lactose) present in the milk and also upon the starch naturally present in the chocolate or cocoa.

One of the particularly desirable new commercial fields for the utilization of this invention is in relation to milk flavored beverages such as chocolate, sodas, nectar, and more particularly milk flavored bodies which are ordinarily and necessarily sold at soda water fountains because of the perishable nature of the products.

It has been an object of the beverage art, heretofore not achieved, to be able to ship and dispense, say milk-chocolate as a carbonated beverage so that it can be used at refreshment counters, public entertainments, and dispensed over the counter or peddled in crates instead of being limited to the narrow field in which it is served at present only by the soda fountains.

In order to thoroughly understand my invention and to differentiate it from that which is known to the art, the following explanation of the peculiarities of these products and their behavior will be useful in connection with this disclosure.

As regards syrups consisting of sugar, chocolate or cocoa and flavor, if mixtures of this character are sterilized by the usual process of heating in an autoclave under, say, steam pressure of approximately twenty pounds pressure, there results a jelling of the starch naturally present in the chocolate or cocoa, making the resulting product wholly unfit for beverage purposes; or, by heating to temperatures of about 180° C. charring will result, rendering the product unfit for the market.

Having described my invention, I claim:

1. The herein described process of treating milk, cream, milk-chocolate or the like, which consists in heating to a temperature of approximately 140° F. and stirring in hydrogen peroxide, continuing the treatment until the bacterial organisms have been destroyed and the hydrogen peroxide substantially eliminated.

2. A sterilizing process for beverages, comprising the mixing of beverage and hydrogen peroxide during agitation and heat treatment at a temperature between 128 and 140° F.

3. The herein described process of sterilizing beverage syrups containing milk, sugar and flavoring matter, which consists in heating the syrup to a temperature between 128 and 140° F. and stirring in hydrogen peroxide slowly to avoid local over-concentration and maintaining said syrup approximately at the specified temperature for a period exceeding one-half hour.

4. The herein described process of treating milk and milk containing liquids which consists in heating the liquid to a temperature of approximately 140° F., agitating the same and slowly adding hydrogen peroxide, continuing said agitation and heat treatment until substantially all of said hydrogen peroxide has been decomposed.

In witness whereof, I hereunto subscribe my name, as attested by the two subscribing witnesses.

FRANK JULIAN ANDRESS.

Witnesses:
R. KISTNER,
GORDON C. AREY.